(12) United States Patent
Sweet

(10) Patent No.: US 11,541,954 B2
(45) Date of Patent: Jan. 3, 2023

(54) SOUND EMITTING DEVICE

(71) Applicant: ENDLESS LUCK, LLC., Encino, CA (US)

(72) Inventor: Jeremy Sweet, Encino, CA (US)

(73) Assignee: ENDLESS LUCK, LLC, Encino, CA (US)

(*) Notice: Subject to any disclaimer, the term of this patent is extended or adjusted under 35 U.S.C. 154(b) by 288 days.

(21) Appl. No.: 17/000,507

(22) Filed: Aug. 24, 2020

(65) Prior Publication Data
US 2022/0055705 A1  Feb. 24, 2022

(51) Int. Cl.
*B62J 3/10* (2020.01)
*H04R 1/02* (2006.01)

(52) U.S. Cl.
CPC .............. *B62J 3/10* (2020.02); *H04R 1/026* (2013.01); *H04R 2400/11* (2013.01)

(58) Field of Classification Search
CPC ......... B62J 3/10; H04R 1/026; H04R 2400/11
See application file for complete search history.

(56) References Cited

U.S. PATENT DOCUMENTS

| | | | | |
|---|---|---|---|---|
| 4,222,040 A | * | 9/1980 | Benson | B62J 3/12 340/384.4 |
| 6,406,049 B1 | | 6/2002 | Jimison et al. | |
| 7,914,306 B1 | * | 3/2011 | Blackwell | H01R 13/5213 439/588 |
| 9,796,441 B1 | | 10/2017 | Roshandel et al. | |
| 2004/0114383 A1 | * | 6/2004 | Beard | B62K 21/26 362/475 |
| 2009/0031841 A1 | * | 2/2009 | Tetsuka | B62M 25/04 74/473.12 |
| 2011/0200202 A1 | | 8/2011 | Flanigan | |
| 2015/0314822 A1 | * | 11/2015 | Pottier | B62J 3/10 340/432 |
| 2016/0025121 A1 | * | 1/2016 | Ahnert | F16B 2/185 403/373 |
| 2022/0135174 A1 | * | 5/2022 | Smallwood | B62K 21/26 74/551.1 |

FOREIGN PATENT DOCUMENTS

| CN | 207460411 U | 6/2018 |
|---|---|---|
| GB | 201114869 A | 8/2011 |

* cited by examiner

*Primary Examiner* — Andrew L Sniezek
(74) *Attorney, Agent, or Firm* — Mark M. Friedman

(57) ABSTRACT

The present invention relates to a sound emitting device. The sound emitting device includes a housing, a memory device. The housing includes a slot. The memory device carries a first number of a sound groups. In addition, each group contains a second number of sounds. The housing is configured to removably receive the memory device. The housing carries a plurality of actuators. In addition, number of actuators are more than the first number. Each sound group is selected using one of the plurality of actuators. At least one actuator is used to toggle between sounds of the selected group.

9 Claims, 10 Drawing Sheets

SOUND EMITTING DEVICE

TECHNICAL FILED

The present invention in general relates to the field electronic system and particularly in the field of sound accessories for vehicles. The present invention specifically discloses a sound emitting device.

BACKGROUND

With the advancement in technology, sound devices such as bike bells, bike horns are accessories for vehicles such as bikes, scooters, bicycles, and the like. The bike bells, bike horns are detachable devices installed onto a bicycle for safety purpose. The sound device is a detachable multimedia device that can be removed to be used independently, or can be installed onto other devices. It is well known that traffic made up of cars, vans, or the like on roads or pedestrians can be a source of potential danger to cyclists. In places where there is heavy traffic, cycling represents a fast, cheap, healthy, and environmentally advantageous alternative to vehicle or public transport use. Cycle couriers are also known to work in urban cities where heavy traffic is likely. Most vehicles have blind spots or dead angles in which cyclists or pedestrians cannot be seen. However, conventional sound device such as bike bells and bike horns lack many useful features. In addition, conventional sound devices lack in safety for riders. Further, conventional sound devices are inefficient to control volume of the sound devices. Furthermore, conventional sound devices do not contain expandable sound cards. Moreover, conventional sound devices lack distance protection, early warning with louder volume, custom sounds, and controllable volume wheels.

The U.S. patent application Ser. No. 09/314,454, discloses an accessory which produces distinct sounds in order to alert others of the presence of a bicycle. The accessory is formed of a housing, sound producing assemblies, and a mounting system. The mounting assembly may be clamped around left or right members of bicycle forks, frame, stays, or braces. Housing of the accessory will accommodate mechanical or electronic sound producing elements which are interchangeable and may be used individually or in combination. When installed and the bicycle is in motion, a variety of sounds may be produced depending on the configuration of the sound producing components.

The U.S. patent application Ser. No. 12/931,960, discloses special novelty effects apparatus are provided for inclusion on bicycles providing a synthesizer circuit device having a microprocessor circuit element and a memory chip element or flash drive element for receiving instructions for novelty sound and lighting effects that simulate atypical sounds and lighting as would be expected to emanate from a bicycle, such as sound of a motorcycle throttling in takeoff with simulated tailpipe emissions though lighting effects, or sounds of a truck or airplane, all for the recreational and entertainment application to a rider of a bicycle.

The GB patent application GB201114869A, discloses an apparatus provides an audible cue that can be used as an alert to an occupant of a vehicle or a pedestrian. The apparatus includes at least one sound emitting element within a housing, the housing being securable to a bicycle, and a trigger element securable to the bicycle, for a rider of the bicycle to indicate when an audible cue is desired. The sound emitting element is arranged to generate an audible cue having a sound pressure level of at least 120 dB. The sound pressure level may further be at least 140 dB. The apparatus may further comprise at least one illumination source such as an LED. The sound emitting element may be arranged to operate in both a loud and quiet mode of operation. The quiet mode of operation may imitate a conventional bicycle bell.

The conventional systems and methods have several disadvantages. In prior arts, the focus is on an accessory that produces distinct sounds in order to alert others of the presence of a bicycle. In addition, the prior art discloses special novelty effects apparatus are provided for inclusion on bicycles providing a synthesizer circuit device having a microprocessor circuit element and a memory chip element or flash drive element for receiving instructions for novelty sound and lighting effects. However, the prior art is incapable to control volume of the sound devices. In addition, the prior art does not contain expandable sound cards. Further, the prior art lacks in distance protection, early warning with louder volume, custom sounds and controllable volume wheels.

In light of the above stated discussion, there is a need for a system which overcomes the above stated disadvantages.

SUMMARY OF THE INVENTION

The present invention relates to a sound emitting device. The sound emitting device includes a housing, a memory device. The housing includes a slot. The memory device carries a first number of a sound groups. In addition, each group contains a second number of sounds. The housing is configured to removably receive the memory device. The housing is configured to removably receive the memory device. The housing carries a plurality of actuators. In addition, number of actuators are more than the first number. Each sound group is selected using one of the plurality of actuators. At least one actuator is used to toggle between sounds of the selected group.

In an embodiment of the present disclosure, the sound emitting device includes a main unit, a base body, and an extension cord and wrap around button.

In an embodiment of the present disclosure, the main unit is programmed for playing last played sound on the main unit when the plurality of actuators are pushed.

In an embodiment of the present disclosure, the main unit, the base body, and the plurality actuators is water resistant.

In an embodiment of the present disclosure, the said base body is attached with the main unit through a quick release clip. In addition, the quick release clip associated with the base body which facilitates snapping and unsnapping of the base body to the main unit, wherein the base body is fixed over associated handlebar of vehicles.

In an embodiment of the present disclosure, the said extension cord and wrap around button comprising a plug-in extension cord and an easy access thumb button.

In an embodiment of the present disclosure, the slot comprising an attached plastic seal plug. In addition, the attached plastic seal plug protects the slot fits over it to keep out water.

In an embodiment of the present disclosure, the main unit comprising a volume wheel. In addition, the volume wheel acts as on/off switch, wherein the volume wheel is operated by the user for adjusting overall volume level (up and down) of the sounds being played.

In an embodiment of the present disclosure, the main unit has an aerodynamic design to help prevent wind resistance.

In an embodiment of the present disclosure, wherein the base body is capable of fixing over a handlebar of range of about 20 millimeters to 36 millimeters.

BRIEF DESCRIPTION OF THE DRAWINGS

The embodiments herein will be better understood in view of the description of the drawings which are as follows.

DETAILED DESCRIPTION OF THE INVENTION

The embodiments herein and the various features and advantageous details thereof are explained more fully with reference to the non-limiting embodiments that are illustrated in the following detailed description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims. The terms like can be, shall be, could be, and other related terms herein disclosed in the foregoing and later parts of the specification in any means do not limit or alter the scope of the present invention. The terms are provided just for the mere understanding of the main invention and its embodiments.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Figure 1:
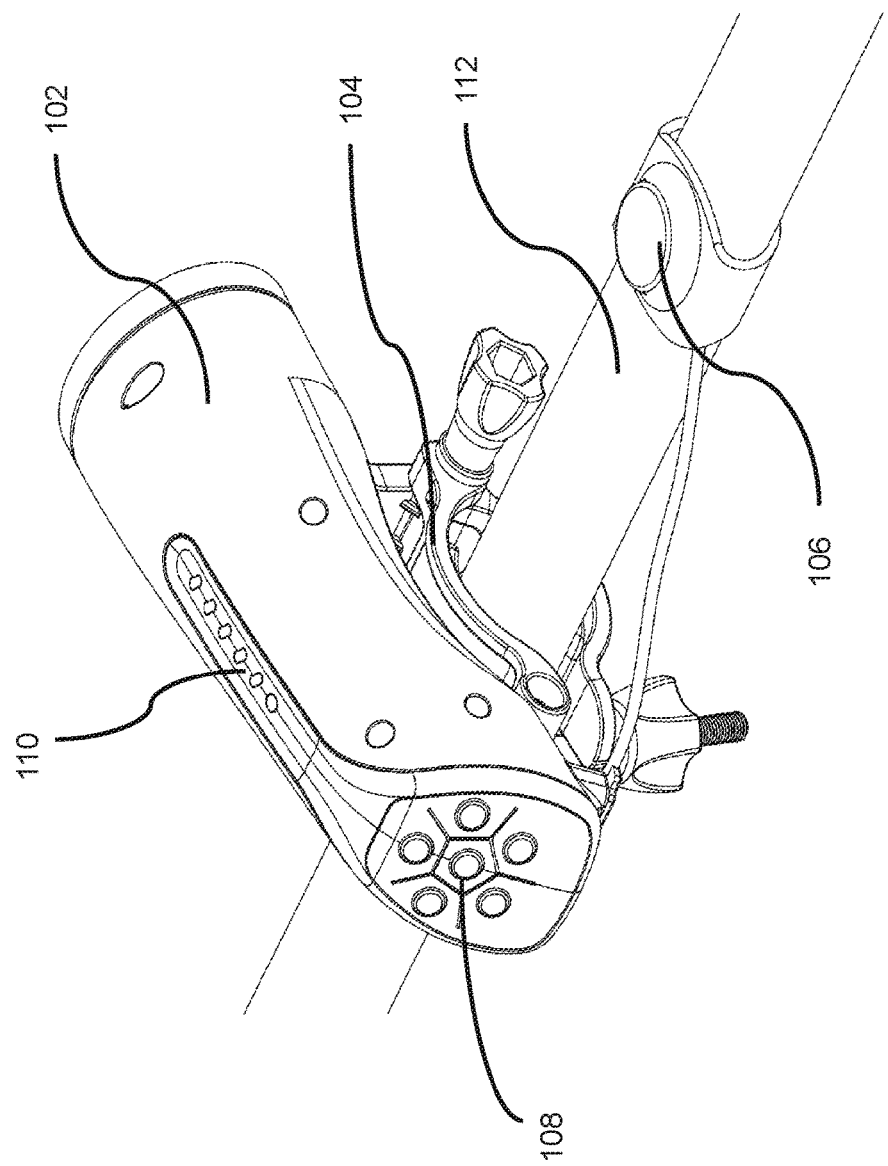
FIG. 1 is a view of an electric horn and sound system, in accordance with various embodiments of the present disclosure.
Figure 2:
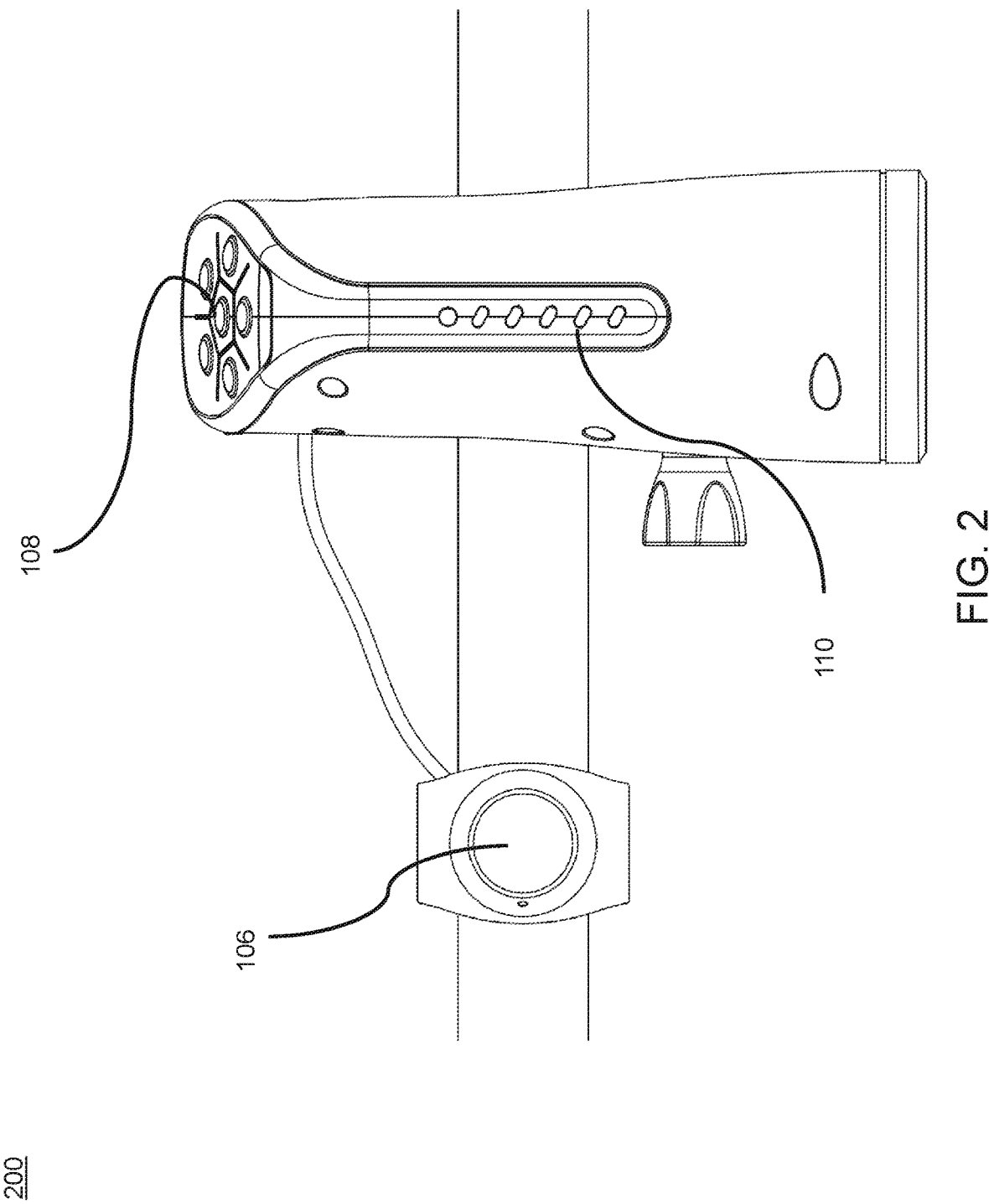
FIG. 2 is a top view of the electric horn and sound system, in accordance with an embodiment of the present disclosure.
Figure 3:
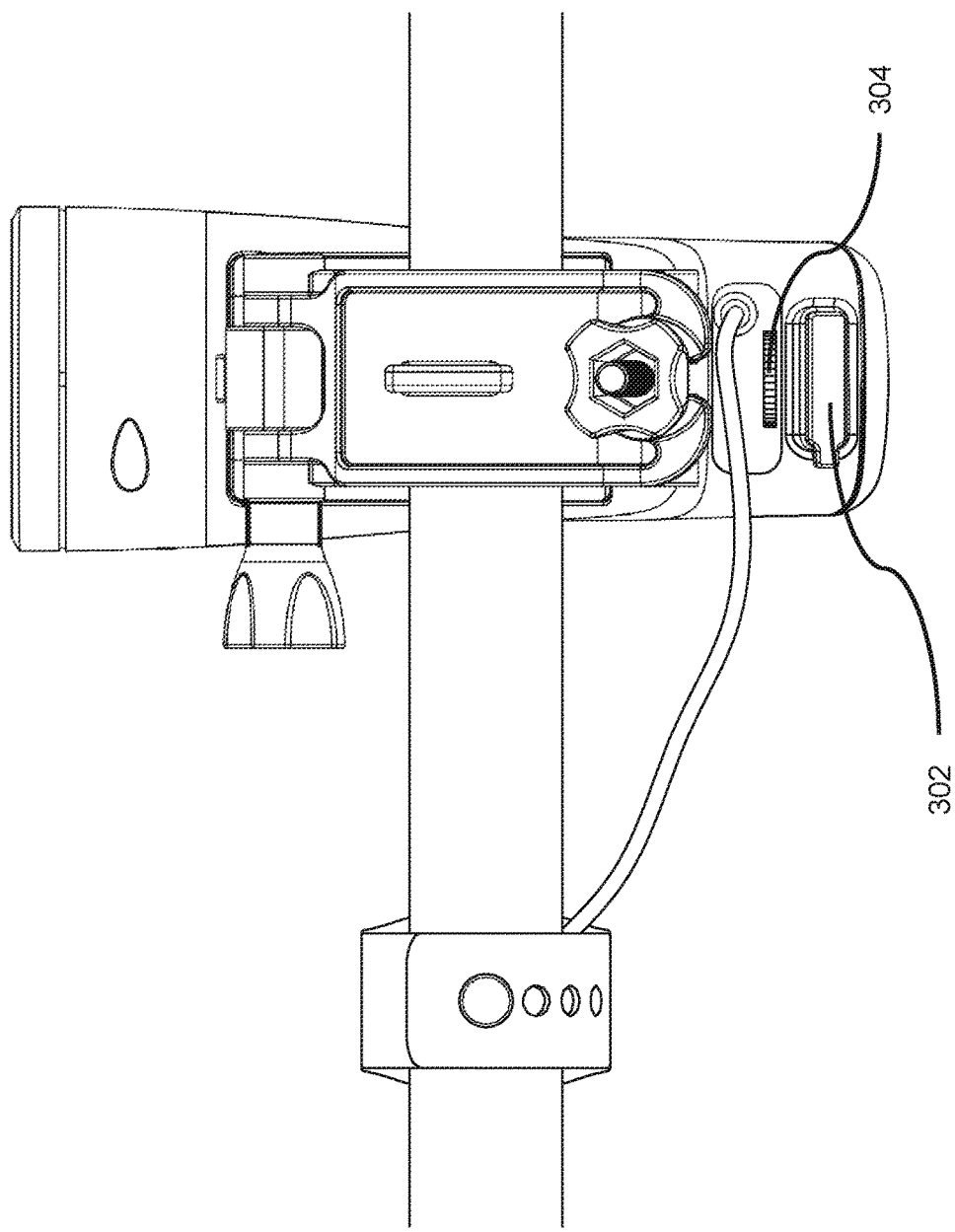
FIG. 3 is a bottom view of the electric horn and sound system, in accordance with an embodiment of the present disclosure.
Figure 4:
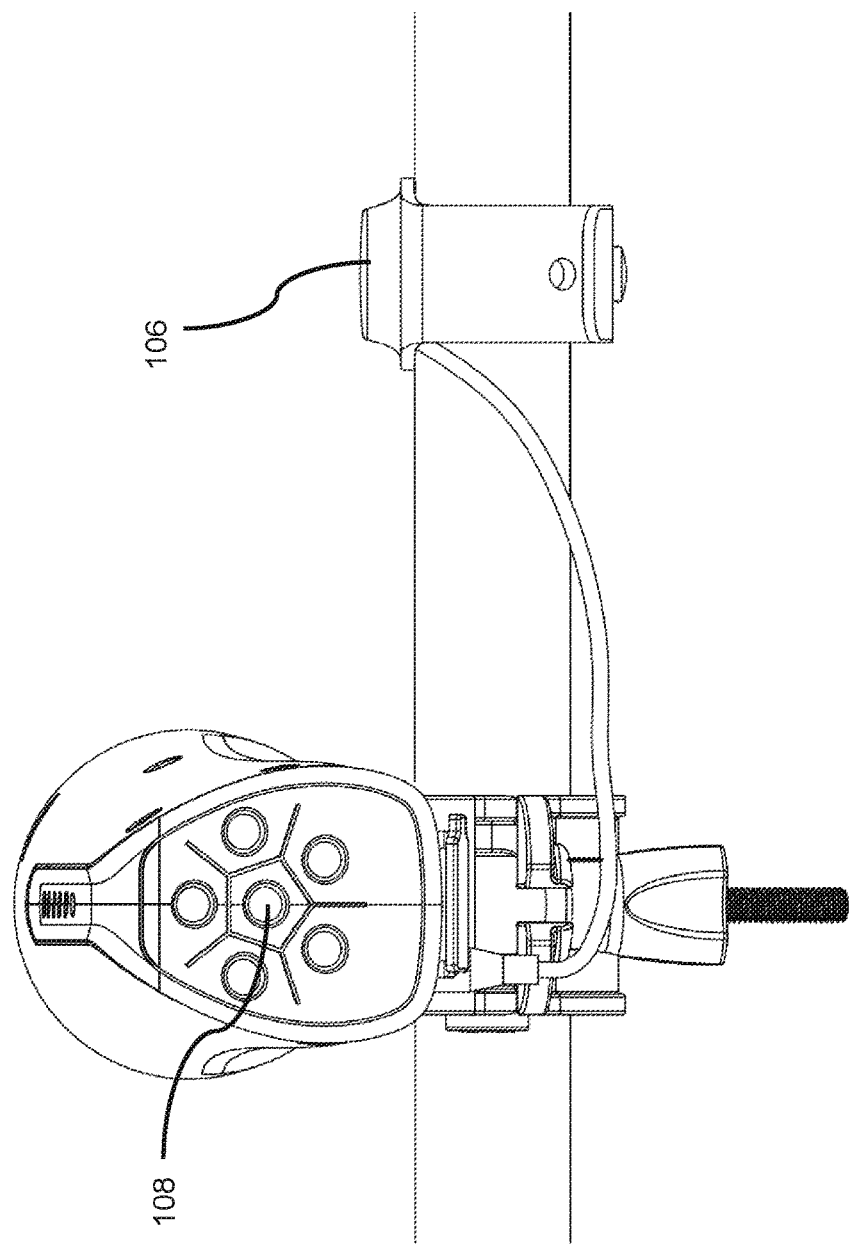
FIG. 4 is a view illustrating a plurality of buttons of the electric horn and sound system, in accordance with an embodiment of the present disclosure.
Figure 5:
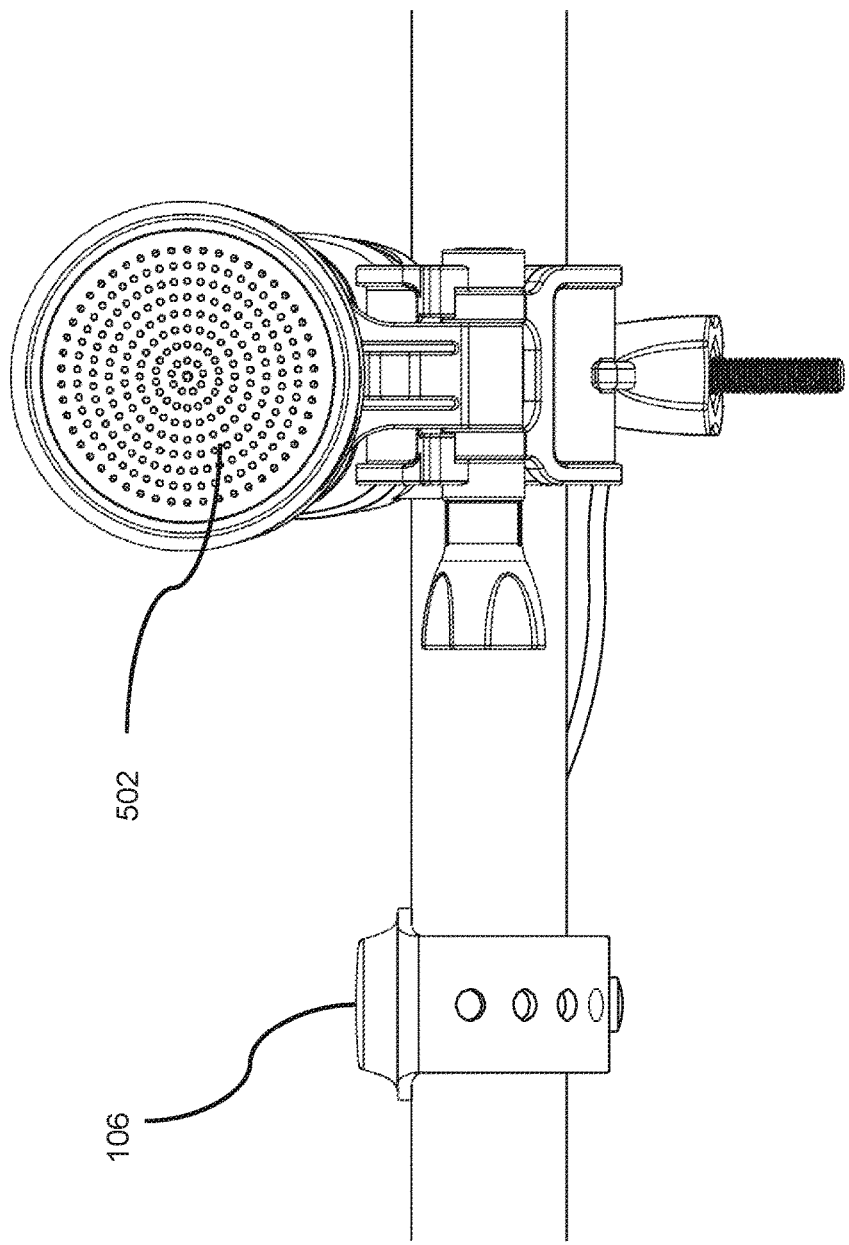
FIG. 5 is a view of a speaker of the electric horn and sound system, in accordance with an embodiment of the present disclosure.
Figure 6:
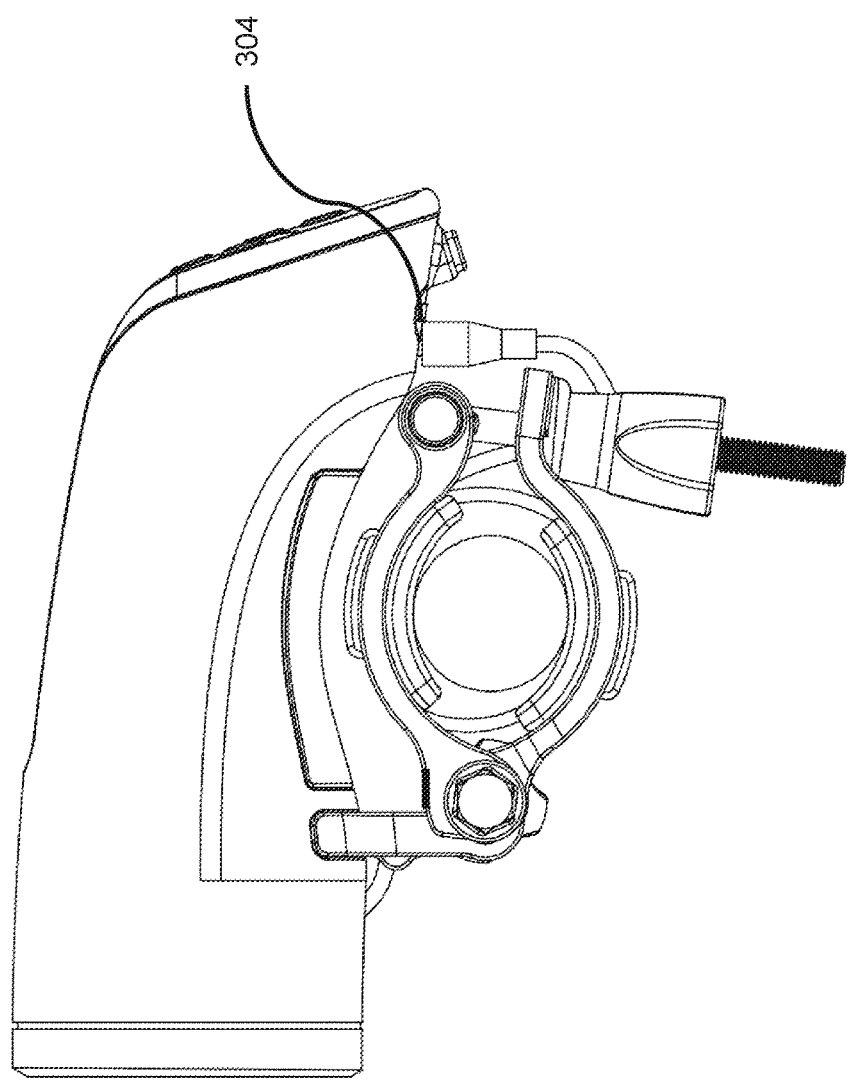
FIG. 6 is a first side view of the electric horn and sound system, in accordance with an embodiment of the present disclosure.
Figure 7:
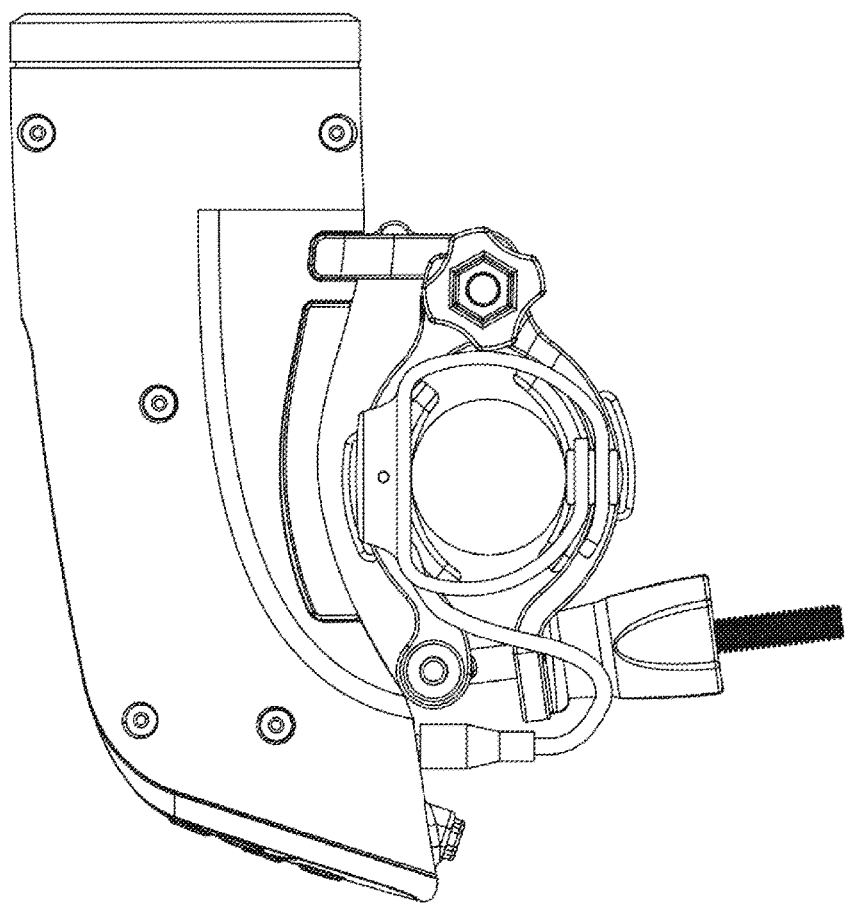
FIG. 7 is a second side view of the electric horn and sound system, in accordance with an embodiment of the present disclosure.

FIG. 1 is a view of a sound emitting device 100, in accordance with various embodiments of the present disclosure. FIG. 2 is a top view of the sound emitting device 100, in accordance with an embodiment of the present disclosure. FIG. 3 is a bottom view of the sound emitting device 100, in accordance with an embodiment of the present disclosure. FIG. 4 is a view illustrating a plurality of buttons 108 on the sound emitting device 100, in accordance with an embodiment of the present disclosure. FIG. 5 is a view of a speaker 502 of the sound emitting device 100, in accordance with an embodiment of the present disclosure. FIG. 6 is a first side view of the sound emitting device 100, in accordance with an embodiment of the present disclosure. FIG. 7 is a second side view of the sound emitting device 100, in accordance with an embodiment of the present disclosure.

The sound emitting device 100 are attached to handlebars, bicycles, scooters, walkers, golf carts, and other bars from about 20 millimeters to 36 millimeters in diameter. The sound emitting device 100 include a main unit 102, a base body 104, and an extension cord and wrap around button 106, and the like. In addition, the sound emitting device 100 include a plurality of buttons 108, light menu 110, and the like. In an embodiment of the present disclosure, the main unit 102 facilitates a user to insert and encrypt a purchased sound card into a card slot 302. In addition, the sound emitting device 100 includes at least 25 embedded internal sounds of a plurality of embedded sound banks. In an embodiment of the present disclosure, the card slot 302 includes an attached plastic seal plug. In addition, the attached seal plug protects the card slot fits over it to keep out water.

The sound emitting device 100 include the main unit 102. In an embodiment of the present disclosure, the main unit 102 includes sounds, speaker 502, amplifier, the card slot 302, the plurality of buttons 108, battery compartment, quick slot, and the like. In an embodiment of the present disclosure, the sound emitting device 100 include the base body 104. In an embodiment of the present disclosure, the base body 104 is attached with the main unit 102 through a quick release clip. In addition, the quick release clip associated with the base body 104 facilitates snapping and unsnapping of the base body 104 to the main unit 102. In an embodiment of the present disclosure, the base body 104 is fixed over associated handlebar 112 of the vehicles. In an embodiment of the present disclosure, the base body 102 having adjustable size of handlebar 112 of size up to 36 millimeters. In an embodiment of the present disclosure, the main unit 102 is powered by 3AAA batteries. In general, rechargeable 3AAA batteries are advised for environmental purposes and re-use.

The sound emitting device 100 include an extension cord and wrap around button 106. In an embodiment of the present disclosure, the extension cord and wrap around button 106 includes a plug-in extension cord and an easy access thumb button.

The sound emitting device 100 include the plurality of embedded sound banks. In an embodiment of the present disclosure, the plurality of embedded sound banks includes 25 internal sounds. In addition, the internal sounds include bike bells, air horns, car horns, classic horns, truck horns, train whistles, fog horns, motorcycle engines revving and driving, trolley bells, or beeps, nutty sounds, bugle calls, and the like. In an embodiment of the present disclosure, 25 internal sounds are divided into 5 banks of the plurality of embedded sound banks.

The sound emitting device 100 include the plurality of buttons 108. In an embodiment of the present disclosure, number of the plurality of buttons 108 on the sound emitting device 100 are six. In an embodiment of the present disclosure, five buttons from the plurality of buttons 108 are arranged in a circular manner and one button from the plurality buttons 108 are fixed in the center of the five buttons of the plurality of buttons 108 (as shown in FIG. 4). In an embodiment of the present disclosure, each of five buttons from the plurality of buttons 108 contains at least five sound banks of the plurality of embedded sound banks. In addition, each five buttons facilitate activation of a particular sound in a selected sound bank. In an embodiment of the present disclosure, each sound bank contains five sounds. In an embodiment of the present disclosure, the plurality of buttons 108 facilitates selection of any sound from any of the sound bank of the plurality of embedded sound banks. In an embodiment of the present disclosure, $6^{th}$ middle button of the plurality of buttons 108 switches or scrolls through the menu banks.

In an embodiment of the present disclosure, the main unit 102, the base body 104, the plurality of buttons 108 are water resistant. In an embodiment of the present disclosure, the main unit 102 has an aerodynamic design to help prevent wind resistance. In an embodiment of the present disclosure, the main unit 102 includes a volume wheel 304. In addition, the volume wheel 304 acts as on/off switch. In addition, the volume wheel 304 is operated by the user to adjust overall volume level (up and down) of the sounds being played.

In an example, maximum volume is much louder than a standard bicycle bell or bike horn in range of about 10 Decibel-15 Decibel louder. In addition, the louder sound for about 10-15 Decibel provides a unique and important feature to add safety, so cars and others can hear the bike coming sooner and prevent accidents.

In an embodiment of the present disclosure, the $6^{th}$ middle menu button (when held down for 3 seconds) of the plurality of buttons 108 also acts as a toggle button. In addition, the $6^{th}$ middle facilitates switching between the internal sounds and those on the inserted sound card. In an embodiment of the present disclosure, the $6^{th}$ LED light out of the light menu 110 turns on, when sounds on the sound card are activated. Further, the $6^{th}$ LED light turns on and provides information about accessing the 25 additional sounds on the sound card to the user. In an embodiment of the present disclosure, the user can purchase or insert additional sound cards encrypted and made specifically for product to have additional and different customized sounds for the unit. In an embodiment of the present disclosure, the light menu 110 attached over the main unit is six. In addition, the $6^{th}$ LCD light from the light menu 110 lights up when the sound card function is activated. Further, five of the LED light from the light menu 110 lights up on the top of the main unit that light up matching which menu bank is selected by the plurality of buttons 108.

Figure 8:
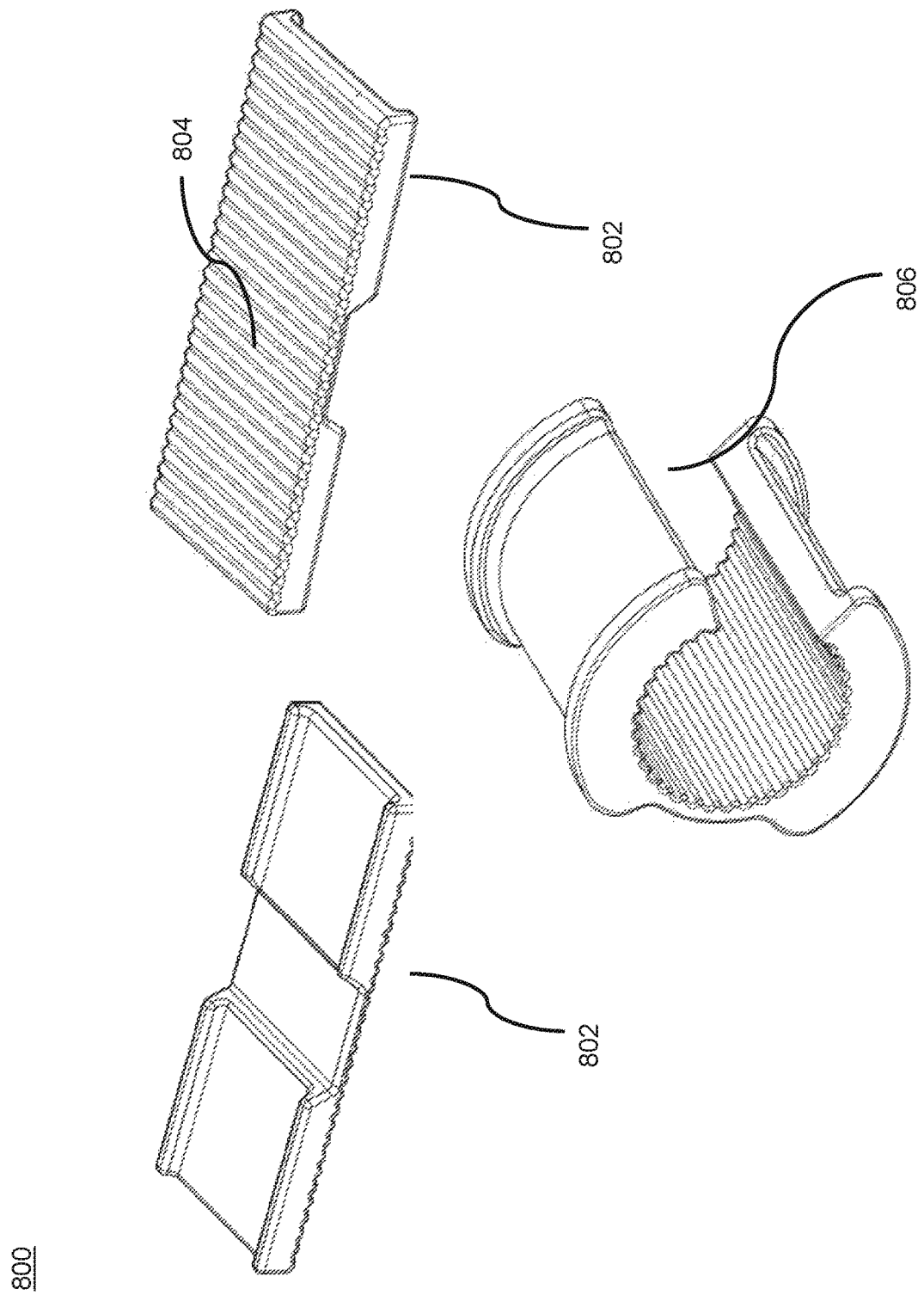
FIG. 8 shows before assembly and after assembly view of a rubber pad to be used along with a base body of the sound emitting device over handlebar, in accordance with an embodiment of the present disclosure.
Figure 9:
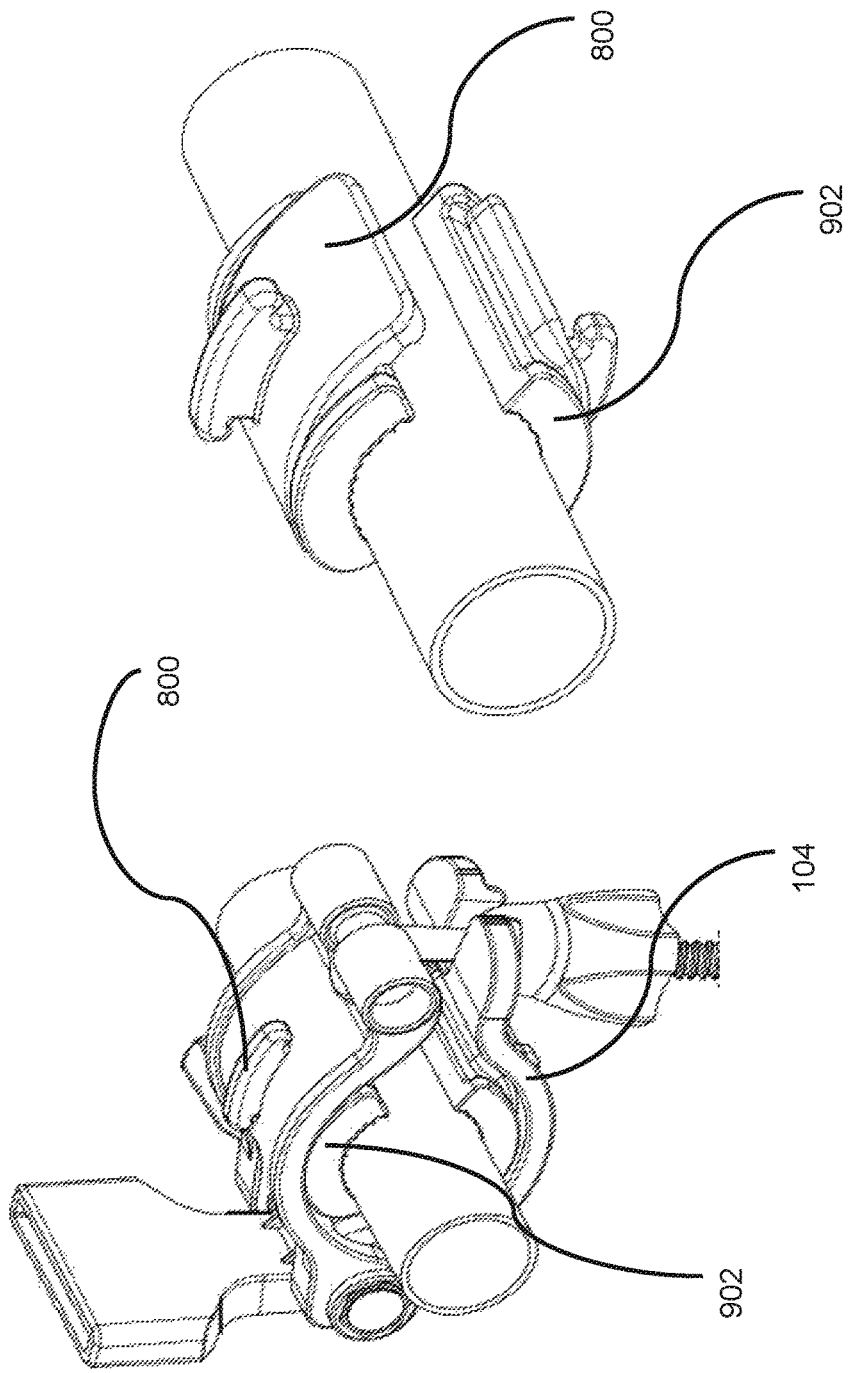
FIG. 9 shows installation of the base body of the sound emitting device along with the rubber pad over handlebar, in accordance with various embodiment of the present disclosure.
Figure 10:
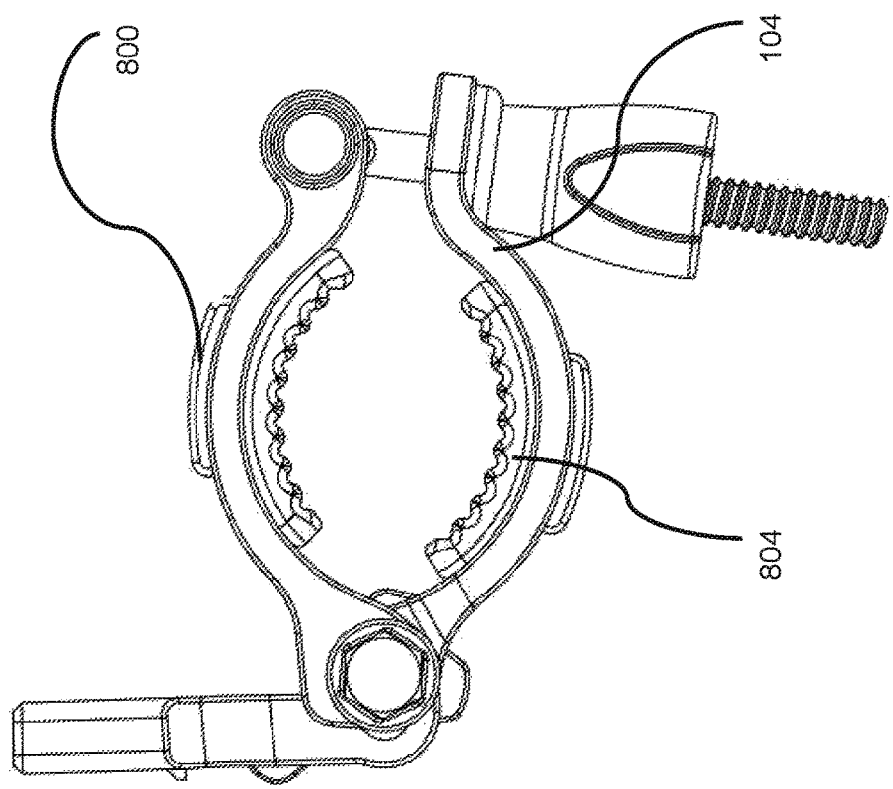
FIG. 10 shows inside arrangement of the rubber pad over the base body, in accordance with an embodiment of the present disclosure.

FIG. 8 shows before assembly 802 and after assembly 804 view of a rubber pad 800 to be used along with the base body 104 of the sound emitting device 100 over handlebar, in accordance with an embodiment of the present disclosure. FIG. 9 shows installation 900 of the base body 104 of the sound emitting device 100 along with the rubber pad 800 over handlebar, in accordance with various embodiment of the present disclosure. FIG. 10 shows inside arrangement 100 of the rubber pad 800 over the base body 104, in accordance with an embodiment of the present disclosure. The rubber pad 800 is characterized by a shape. In addition, the rubber pad 800 includes the shape of a teeth 804 at one side.

In an embodiment of the present disclosure, the rubber pad 800 is characterized by a thickness. In an embodiment of the present disclosure, the thickness of the rubber pad 800 with the teeth 804 is about 4 millimeter. In another embodiment of the present disclosure, the thickness of the rubber pad 800 with teeth 804 may vary. The rubber pad 800 facilitates the sound emitting device 100 to be installed over handlebar of minimum size up to 20 millimeter. In an embodiment of the present disclosure, the sound emitting device 100 fits over handlebar of size in between 20 millimeter to 36 millimeter with facilitation of the rubber pad 800.

The sound emitting device 100 are installed over handlebar through an additional pad 902 and the rubber pad 800 (as shown in FIG. 9). The rubber pad 800 holds the base body 104 of the sound emitting device 100 from the upward position.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms mentioned.

What is claimed is:

1. A sound emitting device, comprising:
   a housing, wherein the housing comprises a main unit having a card slot;
   a memory device, wherein the memory device carrying a first number of a sound groups, wherein each group contains a second number of sounds,
   wherein, the housing is configured to removably receive the memory device;
   wherein, the housing carries a plurality of actuators;
   wherein number of actuators are more than the first number;
   wherein each sound group is selected using one of the plurality of actuators; and
   at least one actuator is used to toggle between sounds of the selected group;
   wherein the main unit is programmed to play last played sound on the main unit when the plurality of actuators are pushed.

2. The sound emitting device as claimed in claim 1, comprising a base body, an extension cord and a wrap around button.

3. The sound emitting device as claimed in claim 2, wherein the said base body is attached with the main unit through a quick release clip, wherein the quick release clip associated with the base body which facilitates snapping and unsnapping of the base body to the main unit, wherein the base body is fixed over associated handlebar of vehicles.

4. The sound emitting device as claimed in claim 2, wherein the said extension cord and wrap around button comprising a plug-in extension cord and an easy access thumb button.

5. The sound emitting device as claimed in claim 2, wherein the main unit comprising a volume wheel, wherein the volume wheel acts as on/off switch, wherein the volume wheel is operated by the user for adjusting overall volume level (up and down) of the sounds being played.

6. The sound emitting device as claimed in claim 2, wherein the main unit has an aerodynamic design to help prevent wind resistance.

7. The sound emitting device as claimed in claim 2, wherein the base body is capable of fixing over a handlebar of range of about 20 millimeters to 36 millimeters.

8. The sound emitting device as claimed in claim 1, wherein the main unit, the base body, and the plurality of actuators are water resistant.

9. The sound emitting device as claimed in claim 1, the card slot comprising an attached plastic seal plug, wherein the attached plastic seal plug protects the card slot fits over it to keep out water.

\* \* \* \* \*